Sept. 30, 1969 A. MACOVSKI 3,470,314

LINE ENCODING FACSIMILE BANDWIDTH REDUCTION SYSTEM

Filed Nov. 16, 1966

INVENTOR.
ALBERT MACOVSKI
BY Samuel Lindenberg
Arthur Frailich
ATTORNEYS 3,470,314

LINE ENCODING FACSIMILE BANDWIDTH REDUCTION SYSTEM

Albert Macovski, Palo Alto, Calif., assignor to Southern Pacific Company, San Francisco, Calif., a corporation of Delaware Filed Nov. 16, 1966, Ser. No. 594,756
Int. Cl. H04n 7/12
U.S. Cl. 178—6 5 Claims This invention relates to video signal encoding techniques for reducing the bandwidth required for transmitting these signals and more particularly to improvements in facsimile systems.

Figure 1:
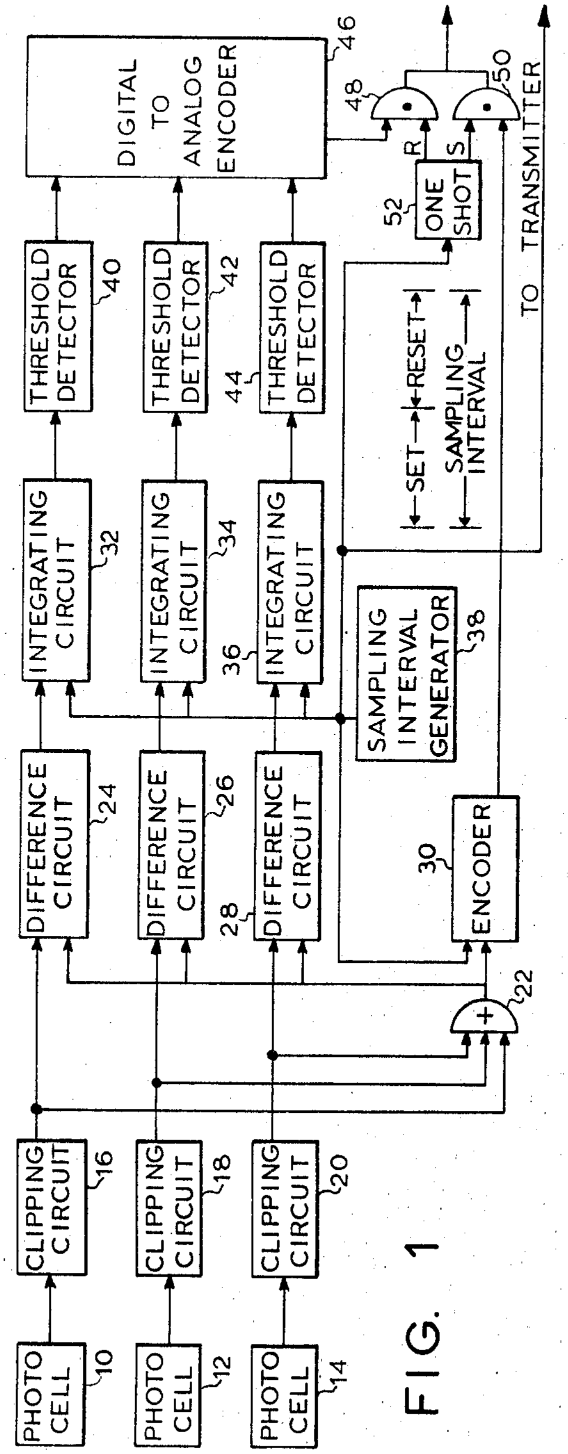

There are a considerable number of video signal bandwidth compression systems. Facsimile type video systems lend themselves most readily to bandwidth compression since they are usually two-level type signals, that is the original copy is either black or white. A photocell employed for scanning the original document usually has its output clipped to establish the two-level (black or white) video signal format. One attempt at compressing the bandwidth required for transmitting these signals is to convert a plurality of these two-level signals, which may be considered as binary signals, into a single analog signal. Means are provided at the transmitter for reconverting the single analog signal back into the "binary" signal which can then be reproduced by writing styli. An illustration of a system of this type is found in Patent No. 3,243,507, which is issued to this inventor.

The system for encoding described in Patent No. 3,243,507, uses three photocells which look at three different picture elements which are then encoded. In a copending application by Hugh F. Frohbach, entitled "Video Signal Encoding Technique for Reduced Bandwidth Transmission," filed Oct. 31, 1966, Ser. No. 590,911, which is assigned to a common assignee, the encoding technique is one wherein over a predetermined sampling interval the succession of two-level video signals are converted into a single analog signal. Similarly, although employing a completely different technique, in an application for "Reduced Bandwidth Facsimile System," by this inventor, Ser. No. 583,766 filed, Oct. 3, 1966, also assigned to a common assignee, there is described an arrangement for encoding the plurality of picture element signals occurring over a predetermined sampling interval into a single analog signal which is then transmitted and reconverted into a plurality of video signals represented by the single analog signal.

The present invention takes over where bandwidth reduction encoding systems of the general type briefly described leave off. A feature of the present system is to provide for a further reduction in bandwidth required for transmitting two-level video signal information.

Still another feature of this invention is the provision of a novel addition to a bilevel video signal bandwidth encoding arrangement wherein a still further reduction in bandwidth may be obtained.

Yet another feature of the present invention is the provision of a novel and unique bandwidth reduction system for facsimile transmission.

These and other objects of the present invention may be achieved by a system which initially scans a plurality of separate locations on an original document simultaneously. By way of illustration, and not by way of limitation, assume that three photocells scan three lines of the original document. The three photocell outputs are clipped to provide two-level video signals. The outputs of the clipping circuits are then applied to three difference circuits respectively and also to an OR gate. The output of the OR gate will be a black level signal as long as a black level signal appears at its input. The output of the OR gate is applied to any two-level video signal encoder, such as one of the types previously briefly described, and also to three difference circuits. The outputs of the three clipping circuits are respectively also applied to the three difference circuits, as a result of which, each of the difference circuits will provide an output only when there is a difference of their inputs.

Thus, should any of the photocells scan a white picture element at the time that the OR gate is producing a black picture element signal in response to one or the other of the remaining photocells looking at a black picture element signal, then the difference circuit will provide an output which is the difference of its two inputs. The encoder circuit normally includes a sampling interval generator which sets the sampling intervals during which the encoder may convert its input (comprising the black video signals of the three lines being scanned together with white video signals over any interval that white exists for all three lines), into a single analog signal. The sampling interval generator also applies its clock output pulses to the three integrating circuits for the purpose of initiating an integrating function at the beginning of each sampling interval.

Each one of the integrating circuits integrates its input from the difference circuits over the interval of the sampling interval. Each one of the integrating circuits applies its output to a following threshold detector which, in response to the integrating circuit output exceeding a predetermined threshold, applies an output to a digital-to-analog encoder. The digital-to-analog encoder generates an analog signal which represents or indicates which one of its threshold detectors did not indicate that its threshold was exceeded. The threshold detector which indicated that its threshold was not exceeded would be indicative of the fact that the difference circuit detected that the particular line with which it was associated was black most or all of the time corresponding to the black output signal of the OR gate. The threshold detector may be set so that should the difference circuit detect black 50% or more of the time, the threshold detector is not actuated.

The output of the digital-to-analog encoder is then combined with the analog signal which is the output of the encoder which is encoding the output of the OR gate each occupying part of a sampling interval. These two signals are then transmitted to a receiver. At the receiver, the analog signal representative of the output of the OR gate is applied to a decoder for converting back into digital or two-level video signals. The analog signal representative of the outputs from the threshold detectors is converted back into a digital signal which is applied to three AND gates, one for each line. The AND gates also have the decoder output applied thereto. The ones of the AND gates which are enabled to pass the black representative video signal outputs from the decoder to subsequent writing styli are those corresponding to the difference circuits which detected black over more than the predetermined interval of the sampling interval. Accordingly, by effectively converting a plurality of lines of video signals into a single representative line of video signals and converting that to an analog signal and by generating a second analog signal indicative of which of the plurality of lines is most nearly like the typical line, and thereafter transmitting these two analog signals, an increase in bandwidth compression is achieved over those described or afforded in prior art systems.

Figure 2:
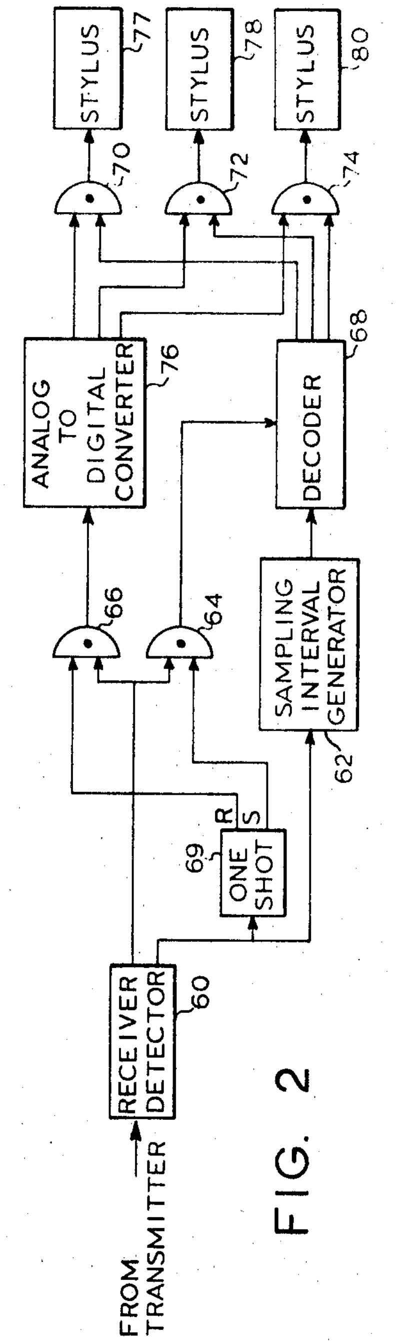

The novel features that are considered characteristic of this invention are set forth with particularity in the appended claims. The invention will best be understood from the following description when read in connection with the accompanying drawings, in which:

FIGURE 1 is a block diagram of the embodiment of the invention which is employed at the transmitter; and FIGURE 2 is a block diagram of the embodiment of the invention which is employed at the receiver for decoding the signals received from the transmitter.

Referring now to FIGURE 1, there may be seen a block schematic diagram of apparatus at a facsimile transmitter, which encodes the facsimile signals in accordance with this invention. As previously indicated, by way of illustration and not by way of limitation upon the invention, three photocells respectively 10, 12, 14 each scans a separate line of an original document, the data from which is to be transmitted to a remote location. In order to insure that the output of the photocells is a two-level signal where one level represents black and the other level represents white, each photocell is connected to a clipping circuit respectively 16, 18, 20. The clipping circuit is a well known circuit arrangement wherein the input signal which exceeds a predetermined threshold level produces an output signal and when the predetermined threshold level is not exceeded at the input, then no output signal is received.

The three clipping circuit outputs are all connected to an OR gate circuit 22 which produces an output signal when any one of its input signals is a black representative signal. The outputs from the three clipping circuits are also respectively connected to three difference circuits 24, 26, 28. The output of the OR gate 22 is connected to an encoder 30, as well as to the second input to each one of the difference circuits 24, 26 and 28. Each one of the difference circuits compares its two inputs and only produces an output signal when the two inputs differ. Since the output of the OR gate is a black representative signal which is present as long as any one of its inputs is a black representative signal, the output of each one of the difference circuits (which are also well known as comparator circuits) will be present only when its input from the clipping circuit is white and the input from the OR gate is black, or may be said to be indicative of the fact that the particular line with which the difference circuit is associated is white. The output of the three difference circuits respectively 24, 26, 28, is applied to the respective integrating circuits, 32, 34, 36. It was previously pointed out that the output of the OR gate was applied to an encoder 30. The encoder functions to encode the binary information applied to its input over predetermined sampling intervals which are determined by the sampling interval generator 38. This constitutes one of the well known clock pulse generators which provide output pulses to define accurate time intervals therebetween. The encoder 30 together with its sampling interval generator may be any known encoding system, such as those previously mentioned herein, which receives a sequence of a plurality of binary signals over the sampling interval and converts the sequence of binary signals either into a single representative analog signal or into some other representative form which requires less bandwidth for transmission than the actual signals themselves.

The output of the sampling interval generator, comprising a sampling pulse, is also applied to the respective integrating circuits 32, 34, 36, for the purpose of initiating a new integrating interval at the beginning of each picture sampling interval by reducing the output of the integrating circuit at that time to a zero or predetermined reference level. Thereafter, each integrating circuit will integrate its input and thus produce at its output a signal whose amplitude just prior to the end of a picture sampling interval is indicative of the amount of white signal present during that interval. Alternatively, the output of each one of the integrating circuits may be considered as indicative of how much the particular line with which the integrating circuit is being scanned, resembles the output of the OR gate. The higher the integrating circuit output the less the particular line resembles the output of the OR gate.

The output of each integrating circuit is applied to a threshold detector respectively 40, 42, 44. These threshold detectors may be identical circuits as the clipping circuits 16, 18, 20, except that the bias level, which must be exceeded by their input is set so that an output signal is applied to a following digital-to-analog encoder 46 when the input signal corresponds to a value obtained in the presence of white being seen by the photocell for more than 50% of the sampling interval.

The digital-to-analog encoder circuit 46 provides at its output a signal having an analog level corresponding to the three binary bit digital signals presented by the outputs of the three threshold detectors 40, 42 and 44. This single analog signal is applied to the AND gate 48. The output of the encoder 30, which also may comprise a single analog signal is applied to another AND gate 50. A one-shot multivibrator 52, in response to the clock signal output of the sampling interval generator 38 provides an output signal to the gate 50 which extends for a proportion of the sampling interval thereby enabling the gate 50 to pass the output of the encoder to a transmitter or directly to the line. The one-shot terminates its output to the gate 50 and resets itself for an interval before the commencement of the next sampling interval providing an output to the gate 48 whereby it is enabled to send the analog signal output of the encoder 46. The division of the sampling interval into two portions for enabling the two analog signals to be transmitted within the sampling interval, may be made on any basis required for the information carried by each analog signal to be fully conveyed in view of noise or other random disturbances. Thus, such division may be on a 50—50 basis for example.

From the foregoing description it should be appreciated that during each sampling interval there are transmitted two analog signals. The clock signal from the sampling interval generator is also transmitted in well known fashion. However, one of the analog signals, which is the output of the encoder, represents during a sampling interval, the occurrence of black on one or more of the lines being scanned and the occurrence of white simultaneously on all of the lines being scanned. The second analog signal represents information indicating which of the lines being scanned most resembles the output of the encoder. These two analog signals may be sent within the same sampling interval adjacent one another in the manner illustrated in FIGURE 1, or they may be transmitted separately by being modulated separately on a carrier. The manner of transmission which is employed should be such as to preserve the identity of the two analog signals.

Referring now to FIGURE 2, there may be seen a block schematic diagram of the apparatus required at a receiver for decoding the two analog signals sent by the transmitter. A receiver detector 60 to which signals from transmitter are applied produces as an output the clock signals and the information carrying analog signals. The clock signals are applied to a sampling interval generator 62 to synchronize its operation with the sampling interval generator 38 at the transmitter. The analog signal output is applied to two AND gates respectively 64, 66. The clock signals are applied to a one-shot multivibrator 69, which is substantially identical with the one-shot multivibrator 52 at the transmitter. It will be recognized that the arrangement of the one-shot multivibrator 69 and AND gates 64 and 66 are employed for the purpose of separating the two analog signals from one another and transferring them into two separate channels. The arrangement shown should be considered as exemplary since any suitable system for switching from one to the other of the analog signals so that they may be directed into two separate channels may be employed.

The one-shot multivibrator, in response to a clock pulse, applies its set output to AND gate 64 to enable it to pass the analog signals which represent the output of the encoder 30. Before the termination of the sampling interval, the one-shot multivibrator resets and its reset output enables AND gate 66 to pass its input which at this time should be the analog signal which is the output of the digital-to-analog encoder 46. The output of AND gate 64 is applied to a decoder 68 whose function it is to produce an output which is a sequence of binary signals corresponding to the binary signal output of the OR gate 22. The output of decoder 68 therefore is a sequence of black representative and white representative signals which are applied to three AND gates 70, 72, 74. The other input to the three AND gates comes from an analog-to-digital generator 76 to which the output of the AND gate 66 is applied. This analog-to-digital generator functions to convert its analog signal input to three separate binary signal outputs which serve to enable the respective AND gates 70, 72 and 74 to pass the output of the decoder 68 to the following writing styli respectively 77, 78 and 80. Each writing stylus is positioned to write a separate line of facsimile copy. The digital output of the analog-to-digital converter should occupy the entire sampling interval. Delay can be inserted to insure proper time coincidence between the digital outputs and the decoded signals.

To summarize the operation of the transmitter and receiver, assume that over a picture interval photocell 10 over line 1 "sees" black-white-black during the picture interval, photocell 12, over line 2 "sees" black-white-white during the picture interval, and photocell 14 over line 3 "sees" white-black-black during the picture interval. Assume, for the purpose of simplification, that the duration of these black and white regions is equal. Thus, the output of the OR gate will be a black signal which extends for the duration of the picture sampling interval. Difference circuit 24 produces an output signal during the white picture element interval, difference circuit 26 will produce an output signal during the two white picture element intervals and difference circuit 28 will produce an output signal during the initial white picture element interval. As a result, only the output from integrating circuit 34 exceeds the threshold of the threshold detector 42. Accordingly, the input to the digital-to-analog encoder from the respective threshold detectors 40, 42 and 44, will be a binary signal "010." This is converted in any of the well known techniques, including those shown in the previously mentioned patent to Macovski, into an analog signal.

At the receiver, the output of the decoder 68 during the sampling interval will be a signal which is representative of black. This is applied to each one of the AND gates 70, 72 and 74. However, the output of the analog-to-digital converter 76, in response to the analog signal from the encoder 46 will be three binary bits of which only those applied to AND gate 70 and AND gate 74 can enable these AND gates. Thus, writing stylus 77 and writing stylus 80 will produce an all black output for the duration of the picture interval while in response to AND gate 72 being closed, writing stylus 78 effectively produces an all white signal during this picture sampling interval. Thus, while there may be some degradation in the resulting reproduction of the original, for black and white copy this is substantially inconsequential and the final result is quite readable. The savings in bandwidth of this invention over that obtained by not using this system in N divided by 2, where N equals the number of sensors which are used. This comparison factor is then multiplied by that of the encoding system used with the OR gated digital signal.

There has been accordingly described and shown herein a novel, useful and unique system for further encoding facsimile type signals.

What is claimed is:

1. Apparatus for encoding the two-level video signals simultaneously derived by scanning a plurality of lines of video signals comprising:

means for establishing a picture sampling interval;

OR gate means to which the video signals derived by scanning said plurality of lines are applied for producing an output corresponding to one of said two-level signals as long as said one of said two-level signals is present at the input;

encoding means to which the output of said OR gate is applied for producing an encoding signal representative thereof over a picture sampling interval;

means for comparing the output of said OR gate with the two-level video signals derived by scanning each line of video signals for producing at the end of each picture sampling interval for each line, a signal indicative of the similarity of the line video signal to the OR gate output signal over a preponderance of a picture sampling interval;

digital-to-analog means to which said plurality of comparing means output is applied for producing an analog signal representative of the output of said comparing means;

means for associating said encoded signal with said analog signal; and means for utilizing said analog signal.

2. Apparatus as recited in claim 1 wherein said comparing means comprises for each line:

difference circuit means having two inputs and an output;

means for applying the output of said OR gate to one of the inputs to said difference circuit;

means for applying the video signals generated by scanning said line to the second input to said difference circuit for producing an output when the two inputs to said difference circuit are dissimilar;

an integrating circuit for each difference circuit;

means for connecting the output of each difference circuit to one of said integrating circuit inputs;

means for initiating the operation of each integrating circuit at the beginning of each picture sampling interval;

a threshold detector circuit means for each integrating circuit for detecting when the output of each integrating circuit exceeds a predetermined threshold level; and means for connecting the outputs of said threshold circuit means to said digital-to-analog encoder means.

3. Apparatus as recited in claim 1 wherein said means for utilizing said encoded signal and said analog signal comprises:

AND gate means for each of said plurality of lines;

a decoder means;

means for applying said encoded signal to said decoder means to be converted back to a train of two-level signals represented by said encoded signal;

means for applying the output of said decoder means to each one of said AND gate means;

analog-to-digital converter means;

means for applying to said analog-to-digital converter means said analog signal to produce at the output of said analog-to-digital converter means a two-level signal pattern wherein one of said two-level signals is indicative of the resemblance of the video signals from a scanned line for the preponderance of a picture sampling interval to the output of said OR gate means; and means for applying said signal pattern to said plurality of AND gates to enable those of said AND gates to pass the video signal output of said decoder which receive said one of said two-level signals.

4. A system for encoding the two-level video signals derived by scanning a plurality of lines of data simultaneously comprising:

OR gate means to which said plurality of video signals is applied, for producing one output level video signal as long as said one output level video signal is present on any one of its inputs;

encoder means connected to receive the output of said OR gate for producing an encoded signal representative of said OR gate means output over a predetermined picture sampling interval;

a means for each line of data being scanned to which the video signals representative of said line and the output of said OR gate means is applied for producing a single signal at the end of a picture sampling interval when said line represents the output of said OR gate means over a predetermined portion of said picture sampling interval;

means for encoding single signals generated by all of said last named means into an analog signal representative thereof;

means for associating each analog signal with the encoded signal for the same picture sampling interval; and means for utilizing said associated encoded signal and analog signal.

5. Apparatus as recited in claim 4 wherein said means for utilizing said associated encoded signal and analog signal comprises:

means for converting said encoded signal to a sequence of two-level video signals represented by said encoded signal;

means for converting said analog signal to a pattern of signals indicative of which of said plurality of lines corresponds to the output of said OR gate means over a predetermined interval of a picture sampling interval;

writing stylus means for each one of said plurality of lines; and means responsive to said signal pattern for applying said sequence of two-level video signals to those of said styli in positions corresponding to lines of original data scanned which produced video signals resembling the output of said OR gate means over a predetermined portion of said picture sampling interval.

References Cited

UNITED STATES PATENTS

| | | | |
|---|---|---|---|
| 3,201,512 | 8/1965 | Mason et al. | 178—6 |
| 3,243,507 | 3/1966 | Macovski | 178—6 |

ROBERT L. GRIFFIN, Primary Examiner

RICHARD K. ECKERT, Jr., Assistant Examiner